United States Patent
Place

(10) Patent No.: US 7,021,190 B2
(45) Date of Patent: Apr. 4, 2006

(54) RACK AND PINION STEERING GEAR WITH INTEGRAL SUPPORT BEARING

(75) Inventor: Jack L. Place, Greeneville, TN (US)

(73) Assignee: TRW Inc., Lyndhurst, OH (US)

( * ) Notice: Subject to any disclaimer, the term of this patent is extended or adjusted under 35 U.S.C. 154(b) by 107 days.

(21) Appl. No.: 10/172,621

(22) Filed: Jun. 14, 2002

(65) Prior Publication Data

US 2003/0230189 A1  Dec. 18, 2003

(51) Int. Cl.
*F15B 9/10* (2006.01)

(52) U.S. Cl. ............. 91/375 R; 92/153; 384/387

(58) Field of Classification Search .......... 91/375 R, 91/375 A, 376 R, 376 A; 92/153; 384/390, 384/392, 4

See application file for complete search history.

(56) References Cited

U.S. PATENT DOCUMENTS

| 654,803 | A | * | 7/1900 | Reynolds | 384/387 |
| 3,669,146 | A | * | 6/1972 | Adams | 91/375 R |
| 3,908,479 | A | * | 9/1975 | MacDuff | 91/375 A |
| 4,499,922 | A | * | 2/1985 | Tanguy | 91/375 R |
| 4,633,963 | A | * | 1/1987 | Hasegawa | 91/375 A |

OTHER PUBLICATIONS

"Lubrication Fundamentals", by J. Geo. Wills, ISBN 0-8247-6976-7, 1980, pp. 118-119.
"Machineries Handbook", 24th Ed., 1992 0-8311-2492-X, pp. 2106.

* cited by examiner

*Primary Examiner*—F. Daniel Lopez
(74) *Attorney, Agent, or Firm*—Tarolli, Sundheim, Covell & Tummino L.L.P.

(57) ABSTRACT

A rack and pinion steering apparatus (10) comprises a first bearing surface (38) that is formed on a surface (36) that defines a passage (24) in housing (12). An input assembly (120) that includes a first portion (124) of a control valve (132) extends into the passage (24) of the housing (12). An output assembly (80) that includes a second portion (84) of the control valve (132) is located in the passage (24) of the housing (12). A second bearing surface (96) is formed on an outer surface (94) of the output assembly (80). The first bearing surface (38) cooperates with the second bearing surface (96) to define an annular space (162) for receiving fluid and for supporting rotation of the output assembly (80) relative to the housing (12).

12 Claims, 2 Drawing Sheets

RACK AND PINION STEERING GEAR WITH INTEGRAL SUPPORT BEARING

TECHNICAL FIELD

The present invention relates to a rack and pinion steering gear and, more particularly, to a hydraulic power-assisted rack and pinion steering gear.

DESCRIPTION OF THE PRIOR ART

A known rack and pinion steering gear includes a housing. A rack bar extends longitudinally through the housing and has opposite ends that are connectable with the steerable wheels of a vehicle. As the rack bar is moved linearly relative to the housing, the steerable wheels of the vehicle are turned.

The known rack and pinion steering gear also includes a pinion gear assembly. The pinion gear assembly includes two support portions and an intermediate gear portion. The gear portion of the pinion gear assembly includes a plurality of helical teeth. The pinion gear assembly is located within the housing and is rotatable relative to the housing. The helical teeth of the gear portion of the pinion gear assembly are in meshing engagement with teeth of the rack bar.

A pair of bearing assemblies supports the pinion gear assembly for rotation relative to the housing. Each bearing assembly extends between the housing and an associated one of the support portions of the pinion gear assembly. During assembly of the known rack and pinion steering gear, the bearing assemblies are pressed into the housing.

SUMMARY OF THE INVENTION

The present invention relates to a rack and pinion steering apparatus for turning steerable wheels of a vehicle in response to rotation of a steering wheel. The rack and pinion steering apparatus comprises a housing that includes first and second passages. A rack bar extends through the first passage of the housing and is movable relative to the housing for turning the steerable wheels of the vehicle. The rack and pinion steering apparatus also includes a hydraulic motor for, when actuated, moving the rack bar relative to the housing. An input assembly is connectable with the steering wheel and includes a first portion of a control valve for directing fluid to the hydraulic motor. The input assembly extends into the second passage of the housing. A first bearing surface is formed on a surface that defines the second passage. An output assembly is located in the second passage of the housing and includes a pinion gear portion that is in meshing engagement with the rack bar and a second portion of the control valve. A second bearing surface is formed on an outer surface of the output assembly. The first bearing surface cooperates with the second bearing surface to define an annular space for receiving fluid for supporting rotation of the output assembly relative to the housing.

BRIEF DESCRIPTION OF THE DRAWINGS

The foregoing and other features of the present invention will become apparent to those skilled in the art to which the present invention relates upon reading the following description with reference to the accompanying drawings, in which.

DETAILED DESCRIPTION OF THE INVENTION

Figure 1:
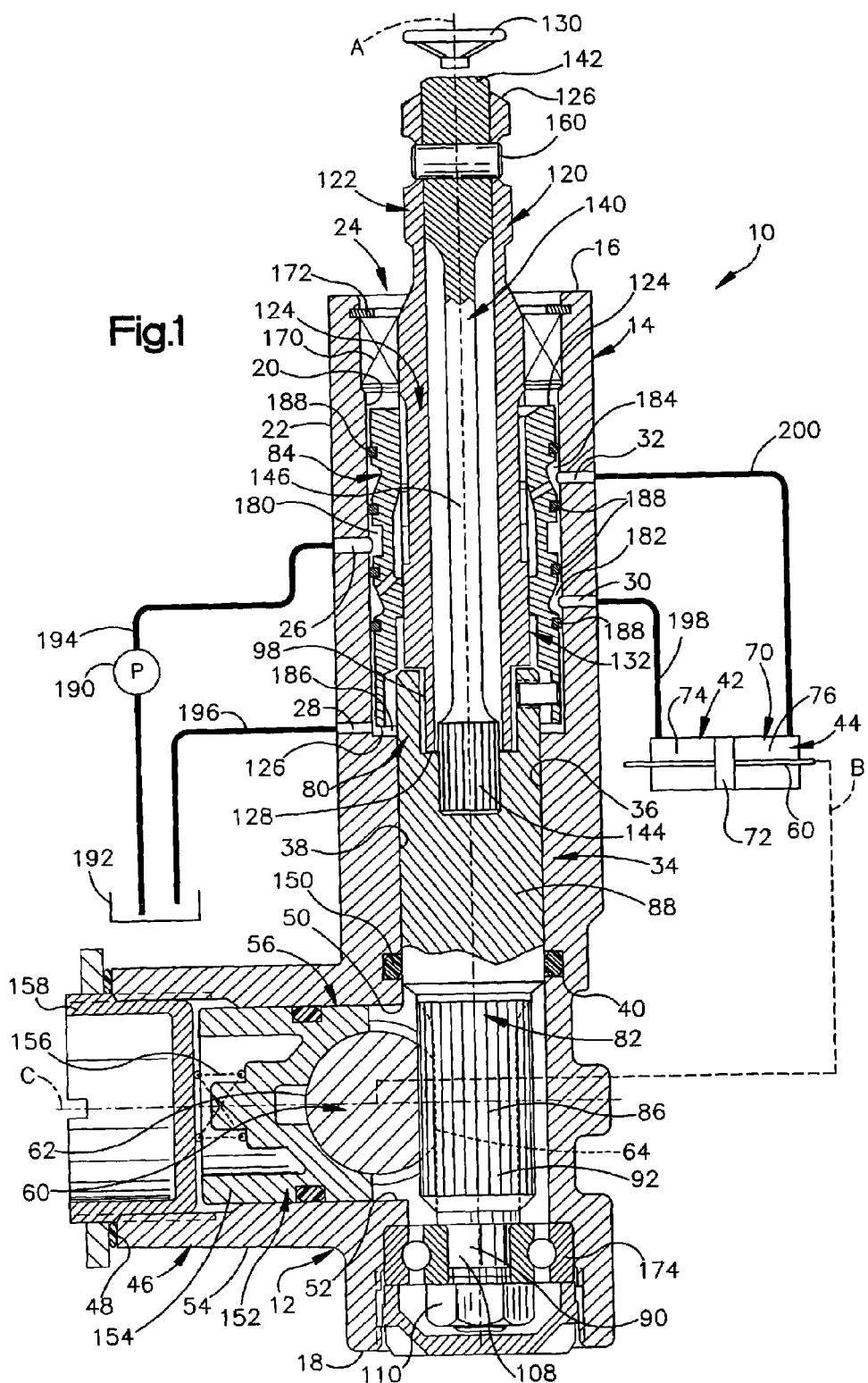
FIG. 1 is a cross-sectional view of a rack and pinion steering gear constructed in accordance with the present invention.

FIG. 1 is a sectional view of a rack and pinion steering gear 10 constructed in accordance with the present invention. The rack and pinion steering gear 10 of FIG. 1 is a hydraulic power-assisted rack and pinion steering gear.

The rack and pinion steering gear 10 includes a housing 12. Preferably, the housing 12 is formed from aluminum. The housing 12 has a first tubular portion 14 that extends along axis A. The first tubular portion 14 has first and second axial ends 16 and 18, respectively, and cylindrical inner and outer surfaces 20 and 22, respectively. The inner surface 20 of the first tubular portion 14 of the housing 12 defines a passage 24 that extends through the first tubular portion. Four radially extending openings extend from the inner surface 20 to the outer surface 22 of the first tubular portion 14. The openings include a fluid inlet opening 26, a fluid outlet opening 28, and first and second motor openings 30 and 32, respectively.

The cylindrical inner surface 20 of the first tubular portion 14 of the housing 12 includes a narrowed portion 34. The diameter of the passage 24 at the narrowed portion 34 is reduced relative to the remainder of the passage. The narrowed portion 34 includes a smooth inner surface 36 that forms a bearing surface 38. The bearing surface 38 is preferably a burnished surface. By burnishing the inner surface 36 of the narrowed portion 34 to form the bearing surface 38, the material hardness of the bearing surface 38 is increased. The narrowed portion 34 also includes a circumferential seal groove 40. The seal groove 40 is located nearer the second axial end 18 of the first tubular portion 14 than the bearing surface 38. Preferably, the seal groove 40 is adjacent the bearing surface 38.

The housing 12 also includes a second tubular portion, shown schematically at 42. The second tubular portion 42 extends perpendicular to the first tubular portion 14 along axis B. Axis B extends into and out of the housing 12, as viewed in FIG. 1, in a direction perpendicular to both axis A and axis C. The second tubular portion 42 has inner and outer surfaces (not shown). The inner surface of the second tubular portion 42 of the housing 12 defines a passage 44 that extends through the second tubular portion 42.

The housing 12 also includes a third tubular portion 46. The third tubular portion 46 extends perpendicular to the first and second tubular portions 14 and 42 along axis C. The third tubular portion 46 has first and second axial ends 48 and 50, respectively and inner and outer surfaces 52 and 54, respectively. The second axial end 50 of the third tubular portion 46 unites with the first and second tubular portions 14 and 42 near the second axial end 18 of the first tubular portion 14. The inner surface 52 of the third tubular portion 46 defines a yoke bore 56. The yoke bore 56 mates with the passage 24 of the first tubular portion 14 and the passage 44 of the second tubular portion 42 near the second axial end 18 of the first tubular portion 14. The inner surface 52 of the yoke bore 56, adjacent the first axial end 48, is threaded, illustrated schematically in FIG. 1.

A longitudinally extending rack bar 60 extends through the passage 44 of the second tubular portion 42 of the housing 12. The rack bar 60 has a generally circular cross-sectional shape that is defined by a generally cylindrical outer surface 62. An upper surface 64 of the rack bar 60 includes a plurality of teeth. Opposite end portions of the rack bar 60 are connectable with steerable wheels (not shown) of a vehicle (not shown). Movement of the rack bar 60 along axis B relative to the housing 12 results in the turning of the steerable wheels of the vehicle.

A hydraulic motor 70, shown schematically in FIG. 1, is also formed in the second tubular portion 42 of the housing 12. The hydraulic motor 70 includes a piston 72 that is fixedly attached to the rack bar 60. The piston 72 extends between the rack bar 60 and the inner surface of the second tubular portion 42 of the housing 12 and divides the second tubular portion of the housing into two variable volume chambers 74 and 76. The hydraulic motor 70 is actuated when a differential pressure arises between the two chambers 74 and 76. The hydraulic motor 70 discontinues operation when the pressure between the two chambers 74 and 76 equalizes. When the hydraulic motor 70 is actuated, fluid pressure moves the piston 72 relative to the housing 12. Movement of the piston 72 results in movement of the rack bar 60 relative to the housing 12 along axis B.

As shown in FIG. 1, an output assembly 80 is located in the first tubular portion 42 of the housing 12. The output assembly 80 includes a pinion gear assembly 82 and a valve sleeve part 84. The pinion gear assembly 82 includes a gear portion 86, a first support portion 88, and a second support portion 90. The gear portion 86 has a plurality of teeth 92 for meshingly engaging the teeth of the rack bar 60.

Figure 2:
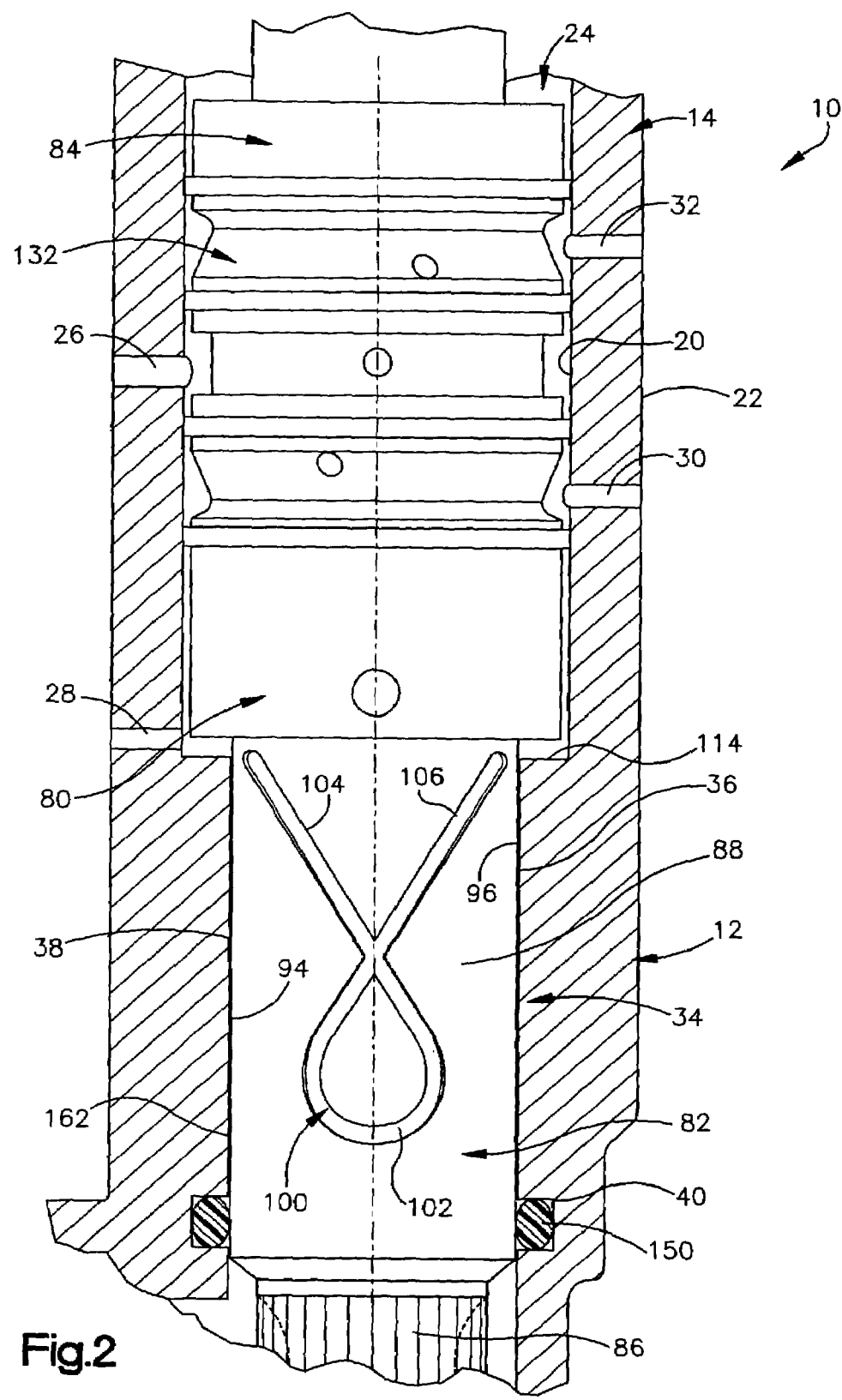
FIG. 2 is an enlarged portion of the rack and pinion steering gear of FIG. 1.

The first support portion 88 of the pinion gear assembly 82 includes a smooth, cylindrical outer surface 94 (FIG. 2). A portion of the outer surface 94 of the first support portion 88 forms a bearing surface 96 (FIG. 2). As will be described below, bearing surface 96 is associated with the bearing surface 38 in the first tubular portion 14 of the housing 12. Bearing surface 96 has an axial length that is greater than an axial length of bearing surface 38. The first support portion 88 also includes an axially extending cavity 98 (FIG. 1) that extends into the first support portion.

A lubrication channel 100 (FIG. 2) is formed in the bearing surface 96 of the first support portion 88 of the pinion gear assembly 82. As shown in FIG. 2, the lubrication channel 100 is alpha-shaped. A ring portion 102 of the lubrication channel 100 is located nearest the gear portion 86 of the pinion gear assembly 82 and two branch portions 104 and 106 of the lubrication channel 100 extend away from the ring portion 102 in a direction away from the gear portion 86 of the pinion gear assembly 82.

The second support portion 90 of the pinion gear assembly 82 also includes a cylindrical outer surface 108. The diameter of the second support portion 90 of the pinion gear assembly 82 is less than the diameter of the first support portion 88. The cylindrical outer surface 108 at an end of the second support portion 90, opposite from the gear portion 86, is threaded for receiving a pinion nut 110.

An input assembly 120 of the rack and pinion steering gear 10 extends into the passage 24 of the first tubular portion 14 of the housing 12. The input assembly 120 includes an input shaft 122 and an integral valve core part 124. The input shaft 122 includes first and second axial ends 126 and 128, respectively. The first axial end 126 of the input shaft 122 is connectable with a steering wheel 130 of the vehicle.

The valve sleeve part 84 of the output assembly 80 and the valve core part 124 of the input assembly 120 collective form a control valve assembly 132 that is responsive to rotation of the steering wheel 130 for directing hydraulic fluid to the hydraulic motor 70. The valve sleeve part 84 of the output assembly 80 and the valve core part 124 of the input assembly 120 are of a known construction.

A torsion bar 140 interconnects the output assembly 80 and the input assembly 120. The torsion bar 140 includes first and second axial end portions 142 and 144, respectively, and a smaller diameter intermediate portion 146. The torsion bar 140 is a spring that twists to allow relative rotation between the valve sleeve part 84 and the valve core part 124.

The rack and pinion steering gear 10 also includes a fluid-tight seal 150 that is located in the seal groove 40 of the first tubular portion 14 of the housing 12. The seal 150 is preferably an O-ring. Alternate seal designs such as a lip seal or quad-seal may also be used.

The rack and pinion steering gear 10 also includes a yoke assembly 152. As shown in FIG. 1, the yoke assembly 152 includes a yoke bearing 154, a spring 156, and a yoke plug 158. The yoke bearing 154 includes a low friction surface for contacting the rack bar 60. The yoke plug 158 includes an outer threaded surface that is screwed into the threads formed on the inner surface 52 of the yoke bore 56.

To assemble the control valve assembly 132, the second axial end portion 144 of the torsion bar 140 is fixed within the cavity 98 in the first support portion 88 of the pinion gear assembly 82 of the output assembly 80. The valve core part 124 of the input assembly 120 is then inserted in the annular space between the valve sleeve part 84 and the torsion bar 140. The first axial end portion 142 of the torsion bar 140 is then fixed to the input shaft 122. FIG. 1 illustrates a pin 160 fixedly attaching the first axial end portion 142 of the torsion bar 140 to the input shaft 122.

According to one method of assembling the rack and pinion steering gear 10, the rack bar 60 is extended through the passage 44 of the second tubular portion 42 of the housing 12 so that teeth of the rack bar 60 are located within the housing 12. The seal 150 is positioned in the seal groove 40 of the first tubular portion 14 of the housing 12 and the assembled control valve assembly 132 is then inserted into the passage 24 of the first tubular portion 14. The control valve assembly 132 is placed in the first tubular portion 14 so that teeth 92 of the gear portion 86 of the pinion gear assembly 82, which is attached to the assembled control valve assembly 132, meshingly engage teeth of the rack bar 60 and so that the input shaft 122, which is also attached to the assembled control valve assembly 132, extends axially outwardly of the first axial end 16 of the first tubular portion 14 of the housing 12.

When the control valve assembly 132 is secured within the first tubular portion 14 of the housing, bearing surface 96 lays adjacent bearing surface 38. A small annular space 162 (FIG. 2) is formed between the bearing surfaces 38 and 96. The two branch portions 104 and 106 of the lubrication channel 100 in the first support portion 88 of the pinion gear assembly 82 extend beyond an end 114 of the narrowed portion 34 of the housing 12, as shown in FIG. 2. The seal 150 extends radially inwardly from the seal groove 40 and contacts the first support portion 88 of the pinion gear assembly 82 on a side of the bearing surface 96 opposite the control valve assembly 132. As will be discussed below, the bearing surfaces 38 and 96 cooperate with one another to rotatably support the output assembly 80 within the housing 12.

The rack and pinion steering gear 10 also includes two bearing assemblies. A first bearing assembly 170 is located in the passage 24 adjacent the first axial end 16 of the first tubular portion 14 of the housing 12. The first bearing assembly 170 extends between the housing 12 and the input shaft 122 and enables rotation of the input shaft relative to the housing 12. A retaining ring 172 holds the first bearing assembly 170 in the first tubular portion 14 of the housing 12.

A second bearing assembly 174 is located in the passage 24 of the first tubular portion 14 between the yoke bore 56 and the second axial end 18 of the first tubular portion 14. The second bearing assembly 174 extends between the housing 12 and the second support portion 90 of the pinion gear assembly 82 and enables rotation of the pinion gear assembly relative to the housing. The second bearing assembly 174 is held relative to the pinion gear assembly 82 by a pinion nut 110 that is screwed onto the threads of the second support portion 90.

The yoke bearing 154 is inserted into the yoke bore 56 of the third tubular portion 46 of the housing 12. When properly inserted, the yoke bearing 154 contacts the outer surface 62 of the rack bar 60 in a location opposite the teeth of the gear portion 86 of the pinion gear assembly 82. The spring 156 is then placed on the yoke bearing 154 and the yoke plug 158 is screwed into the first axial end 48 of the third tubular portion 46 of the housing 12. When the yoke plug 158 is screwed into the housing 12, the spring 156 is compressed between the yoke plug 158 and the yoke bearing 154. The yoke plug 156 may be screwed into the housing 12 a distance necessary to compress the spring 156 a predetermined amount for applying a predetermined force to the rack bar 60 with the yoke bearing 154.

When the rack and pinion steering gear 10 is assembled, four annular channels are formed between the valve sleeve part 84 and the inner surface 20 of the first tubular portion 14 of the housing 12. As shown in FIG. 1, the four annular channels include an annular inlet channel 180, annular first and second motor channels 182 and 184, and an annular outlet channel 186. The annular outlet channel 186 is in fluid communication with the annular space 162 formed between the bearing surfaces 38 and 96. Fluid-tight seals 188, four of which are shown in FIG. 1, seal each of the four channels 180–186 from adjacent channels.

A pump 190 draws hydraulic fluid from a reservoir 192 and supplies the hydraulic fluid to the control valve assembly 132. Conduit 194 extends between pump 190 and the fluid inlet opening 26 of the housing 12 for carrying fluid from the pump 190 to the control valve assembly 132. Conduit 196 extends from the fluid outlet opening 28 of housing 12 to the reservoir 192 for returning hydraulic fluid to the reservoir. The rack and pinion steering gear 10 also includes conduit 198 that provides fluid communication between the first motor opening 30 and chamber 74 of the hydraulic motor 70 and conduit 200 that provides fluid communication between the second motor opening 32 and chamber 76. Fluid flow through conduits 198 and 200 is bidirectional. Thus, when the volume of chamber 74 of the hydraulic motor 70 is increasing, fluid flows through conduit 198 toward the hydraulic motor 70 and through conduit 200 away from the hydraulic motor. When the volume of chamber 74 of the hydraulic motor 70 is decreasing, fluid flows through conduit 200 toward the hydraulic motor and through conduit 198 away from the hydraulic motor.

When the rack and pinion steering gear 10 is mounted on a vehicle, the input shaft 122 is operatively coupled to the steering wheel 130 of the vehicle. Rotation of the steering wheel 130 results in rotation of the input shaft 122. Since the input shaft 122 is fixed relative to the first axial end portion 142 of the torsion bar 140, rotation of the input shaft 122 results in rotation of the first axial end portion 142 of the torsion bar 140. If resistance to the turning of the steerable wheels of the vehicle is above a threshold level, the second axial end portion 144 of the torsion bar 140 will not be rotated by rotation of the first axial end portion 142 of the torsion bar 140. As a result, rotation of the first axial end portion 142 of the torsion bar 140 relative to the second axial end portion 144 will cause torsion or twisting of the intermediate portion 146 of the torsion bar 140. Torsion of the intermediate portion 146 of the torsion bar 140 causes the valve core part 124 of the control valve assembly 132 to rotate relative to the valve sleeve part 84 for directing fluid toward one of the chambers 74 and 76 of the hydraulic motor 70, as is known. For example, if fluid is directed toward chamber 76, fluid pressure increases in the second annular motor channel 184, in conduit 200, and in chamber 76 of the hydraulic motor 70. A higher pressure in chamber 76 relative to the pressure in chamber 74 results in a differential pressure that causes the piston 72 to move leftward, as viewed in FIG. 1. When the piston 72 moves, the rack bar 60 moves and the steerable wheels are turned.

As the volume of chamber 76 increases, the volume of chamber 74 decreases. Fluid flows out of chamber 74, through conduit 198, and into the first annular motor channel 182. Fluid then flows through the valve core part 124 and into the annular outlet channel 186.

During movement of the rack bar 60 relative to the housing 12, interaction of teeth of the rack bar 60 with teeth 92 of the gear portion 86 of the pinion gear assembly 82 rotates the output assembly 80 in a follow-up manner relative to the valve core part 124. As a result, movement of the rack bar 60 rotates the valve sleeve part 84 relative to the valve core part 124 to remove twisting from the torsion bar 140, i.e., return the control valve assembly 132 to a neutral position.

The bearing surfaces 38 and 96 cooperate to form the annular space 162. Since the annular space 162 formed between bearing surfaces 38 and 96 is in fluid communication with the annular outlet channel 186, a portion of the fluid flowing into the annular outlet channel 186 fills the annular space 162 between the bearing surfaces 38 and 96. The fluid in the annular space 162 forms a thin layer of lubrication between the bearing surfaces 38 and 96 and permits low-friction movement of bearing surface 96 relative to bearing surface 38. Thus, the fluid received in the annular space 162 between the bearing surfaces 38 and 96 supports rotation of the output assembly 80 relative to the housing 12. The lubrication channel 100 in bearing surface 96 provides fluid storage capacity in the bearing surface 96 and acts to guide fluid into the annular space 162 during relative rotation between bearing surfaces 38 and 96. The lubrication channel 100 is responsive to the relative rotation between the output assembly 80 and the housing 12 for guiding fluid into the annular space 162. More particularly, the lubrication channel 100 is responsive to the relative rotation between the bearing surfaces 38 and 96 for guiding fluid into the annular space 162. By guiding fluid into the annular space 162 between bearing surfaces 38 and 96, the lubrication channel 100 prevents heat build up that may result in fluid breakdown.

The rack and pinion steering gear 10 of the present invention includes fewer parts than known rack and pinion steering gears. As a result, a cost savings relative to the known rack and pinion steering gears is realized. As an additional benefit of using fewer parts, assembly of the rack and pinion steering gear 10 of the present invention is simplified as compared to the known rack and pinion steering gears.

From the above description of the invention, those skilled in the art will perceive improvements, changes and modifications. For example, the lubrication channel 100 may be formed in bearing surface 38. Additionally, the seal groove 40 may be formed in the first support surface 88 of the pinion gear assembly 82. Such improvements, changes and modifications within the skill of the art are intended to be covered by the appended claims.

Having described the invention, I claim the following:

1. A rack and pinion steering apparatus for turning steerable wheels of a vehicle in response to rotation of a steering wheel, the apparatus comprising:
   a housing including first and second passages, a first inner surface of the housing defining the first passage and a second inner surface of the housing defining the second passage;
   a rack bar extending through the first passage of the housing and being movable relative to the housing for turning the steerable wheels of the vehicle;
   a hydraulic motor for, when actuated, moving the rack bar relative to the housing;
   an input assembly being connectable with the steering wheel and including a first portion of a control valve for directing fluid to the hydraulic motor, the input assembly extending into the second passage of the housing;
   a portion of the second inner surface of the housing forming a first bearing surface;
   an output assembly located in the second passage of the housing and including a pinion gear portion that is in meshing engagement with the rack bar and also including a second portion of the control valve, an outer surface of the output assembly including a second bearing surface, the first bearing surface cooperating with the second bearing surface to define an annular space for receiving fluid for supporting rotation of the output assembly relative to the housing; and
   a lubrication channel extending into the second bearing surface and intersecting the outer surface of the output assembly, the lubrication channel being in fluid communication with the annular space and including a portion that extends axially beyond the first bearing surface and into fluid communication with a fluid channel of the control valve,
   wherein the portion of the lubrication channel that extends axially beyond the first bearing surface and into fluid communication with the fluid channel of the control valve is a first portion, the lubrication channel also including a second portion that is spaced away from the first portion and that also extends axially beyond the first bearing surface and into fluid communication with the fluid channel of the control valve.

2. The apparatus of claim 1 wherein the fluid channel of the control valve is an outlet channel of the control valve.

3. A rack and pinion steering apparatus for turning steerable wheels of a vehicle in response to rotation of a steering wheel, the apparatus comprising:
   a housing including first and second passages, a first inner surface of the housing defining the first passage and a second inner surface of the housing defining the second passage;
   a rack bar extending through the first passage of the housing and being movable relative to the housing for turning the steerable wheels of the vehicle;
   a hydraulic motor for, when actuated, moving the rack bar relative to the housing;
   an input assembly being connectable with the steering wheel and including a first portion of a control valve for directing fluid to the hydraulic motor, the input assembly extending into the second passage of the housing;
   a portion of the second inner surface of the housing forming a first bearing surface;
   an output assembly located in the second passage of the housing and including a pinion gear portion that is in meshing engagement with the rack bar and also including a second portion of the control valve, an outer surface of the output assembly including a second bearing surface, the first bearing surface cooperating with the second bearing surface to define an annular space for receiving fluid for supporting rotation of the output assembly relative to the housing; and
   a lubrication channel extending into the second bearing surface and intersecting the outer surface of the output assembly, the lubrication channel being in fluid communication with the annular space and including a portion that extends axially beyond the first bearing surface and into fluid communication with a fluid channel of the control valve,
   wherein the lubrication channel includes a ring portion and first and second branch portions; the portion of the lubrication channel that extends axially beyond the first bearing surface and into fluid communication with the fluid channel of the control valve being an end of the first branch portion opposite the ring portion.

4. The apparatus of claim 3 wherein the second branch portion also includes an end opposite the ring portion that extends axially beyond the first bearing surface and into fluid communication with the fluid channel of the control valve.

5. A rack and pinion steering apparatus for turning steerable wheels of a vehicle in response to rotation of a steering wheel, the apparatus comprising:
   a housing including first and second passages, a first inner surface of the housing defining the first passage and a second inner surface of the housing defining the second passage;
   a rack bar extending through the first passage of the housing and being movable relative to the housing for turning the steerable wheels of the vehicle;
   a hydraulic motor for, when actuated, moving the rack bar relative to the housing;
   an input assembly being connectable with the steering wheel and including a first portion of a control valve for directing fluid to the hydraulic motor, the input assembly extending into the second passage of the housing;
   a portion of the second inner surface of the housing forming a first bearing surface;
   an output assembly located in the second passage of the housing and including a pinion gear portion that is in meshing engagement with the rack bar and also including a second portion of the control valve, an outer surface of the output assembly including a second bearing surface, the first bearing surface cooperating with the second bearing surface to define an annular space for receiving fluid for supporting rotation of the output assembly relative to the housing; and
   a lubrication channel extending into the second bearing surface and intersecting the outer surface of the output assembly, the lubrication channel being in fluid communication with the annular space and including a portion that extends axially beyond the first bearing surface and into fluid communication with a fluid channel of the control valve,
   wherein the first bearing surface has an axial length that is greater than a diameter of the second passage of the housing at a location of the first bearing surface.

6. A rack and pinion steering apparatus for turning steerable wheels of a vehicle in response to rotation of a steering wheel, the apparatus comprising:

a housing including first and second passages, a first inner surface of the housing defining the first passage and a second inner surface of the housing defining the second passage;

a rack bar extending through the first passage of the housing and being movable relative to the housing for turning the steerable wheels of the vehicle;

a hydraulic motor for, when actuated, moving the rack bar relative to the housing;

an input assembly being connectable with the steering wheel and including a core part of a control valve for directing fluid to the hydraulic motor, the input assembly extending into the second passage of the housing;

a portion of the second inner surface of the housing including a first bearing surface;

an output assembly located in the second passage of the housing and including a pinion gear portion that is in meshing engagement with the rack bar and also includes a sleeve part of the control valve, a cavity extending into the output assembly for receiving an end portion of a torsion bar that connects the core and sleeve parts of the control valve, an outer surface of the output assembly including a second bearing surface;

a lubrication channel extending into the second bearing surface, a first portion of the lubrication channel being axially aligned with the end portion of the torsion bar and a second portion of the lubrication channel extending axially beyond the end portion of the torsion bar toward the pinion gear portion of the output assembly, the first bearing surface cooperating with the second bearing surface to define an annular space for receiving fluid for supporting rotation of the output assembly relative to the housing, the annular space being free of a mechanical bearing which has parts engaging the outer surface of the output assembly and the second inner surface of the housing, the lubrication channel helping to guide fluid from the control valve into the annular space;

the lubrication channel further including third and fourth portions that are spaced away from one another and that both extend into fluid communication with a fluid channel of the control valve.

7. The apparatus of claim 6 further including a seal that extends between the housing and the output assembly, the seal contacting the output assembly between the second bearing surface and the pinion gear portion for preventing fluid from migrating to the pinion gear portion of the output assembly.

8. The apparatus of claim 7 wherein the second passage of the housing includes a circumferential groove that extends into the housing relative to the first bearing surface, the circumferential groove receiving the seal and preventing movement of the seal relative to the housing.

9. The apparatus of claim 8 wherein the seal is an O-ring.

10. The apparatus of claim 6 wherein a narrowed portion of the second passage of the housing defines a smallest diameter of the second passage, the first bearing surface forming a smooth inner surface of the narrowed portion.

11. The apparatus of claim 10 wherein the first bearing surface, which is formed on the narrowed portion of the second passage of the housing, has a first axial length and wherein the second bearing surface has a second axial length that is greater than the first axial length, a portion of the second bearing surface extending beyond the first bearing surface and into fluid communication with the fluid channel of the control valve.

12. The apparatus of claim 6 wherein the second portion of the lubrication channel includes a ring portion.

* * * * *